United States Patent [19]
Ingalls

[11] 3,758,921
[45] Sept. 18, 1973

[54] CRAWFISH PEELER
[76] Inventor: Edgar J. Ingalls, Kendalwod Rd., Baton Rouge, La.
[22] Filed: May 13, 1971
[21] Appl. No.: 142,944

[52] U.S. Cl............................. 17/71, 17/73, 17/48
[51] Int. Cl............................................. A22c 29/00
[58] Field of Search ...................... 17/73, 71, 63, 48

[56] References Cited
UNITED STATES PATENTS
| 965,706 | 7/1910 | Greiner | 17/73 |
|---|---|---|---|
| 3,221,363 | 12/1965 | Couret | 17/48 |

FOREIGN PATENTS OR APPLICATIONS
| 1,117,033 | 2/1956 | France | 17/63 |
|---|---|---|---|
| 242,322 | 4/1960 | Australia | 17/73 |
| 1,909,332 | 10/1970 | Germany | 17/73 |

*Primary Examiner*—Lucie H. Laudenslager
*Attorney*—Watson, Cole, Grindle & Watson

[57] ABSTRACT

A machine for automatically peeling crawfish or other crustaceans in which the crustacean to be peeled has its head and tail respectiely held between grippers on separate conveyers having operative runs which diverge in the direction of their movement. The grippers of the two conveyers are in laterally opposed pairs which are located abreast of and adjacent to each other at the loading ends of the conveyers to receive the head and tail sections respectively of the crustacean and thereafter to separate the head and tail sections as they move apart due to the divergence of the operative conveyer runs, with the meat remaining in the tail section. The grippers of each pair are automatically spread apart for loading and discharge as the conveyers curve around supporting sprockets at the loading and discharge ends of each operative conveyer run and are in gripping engagement with the head and tail sections respectively of the crustacean throughout movement of the operative run between such sprockets.

Means is provided for removing any fat clinging to the head section. The meat retained within the tail section is ejected by shearing off the extremity of the tail section incident to movement of its associated conveyer, then injecting a plast of pressurized air into the tail section through the opening formed by such shearing operation, the empty shells then being discharged at the ends of the operative runs.

3 Claims, 2 Drawing Figures

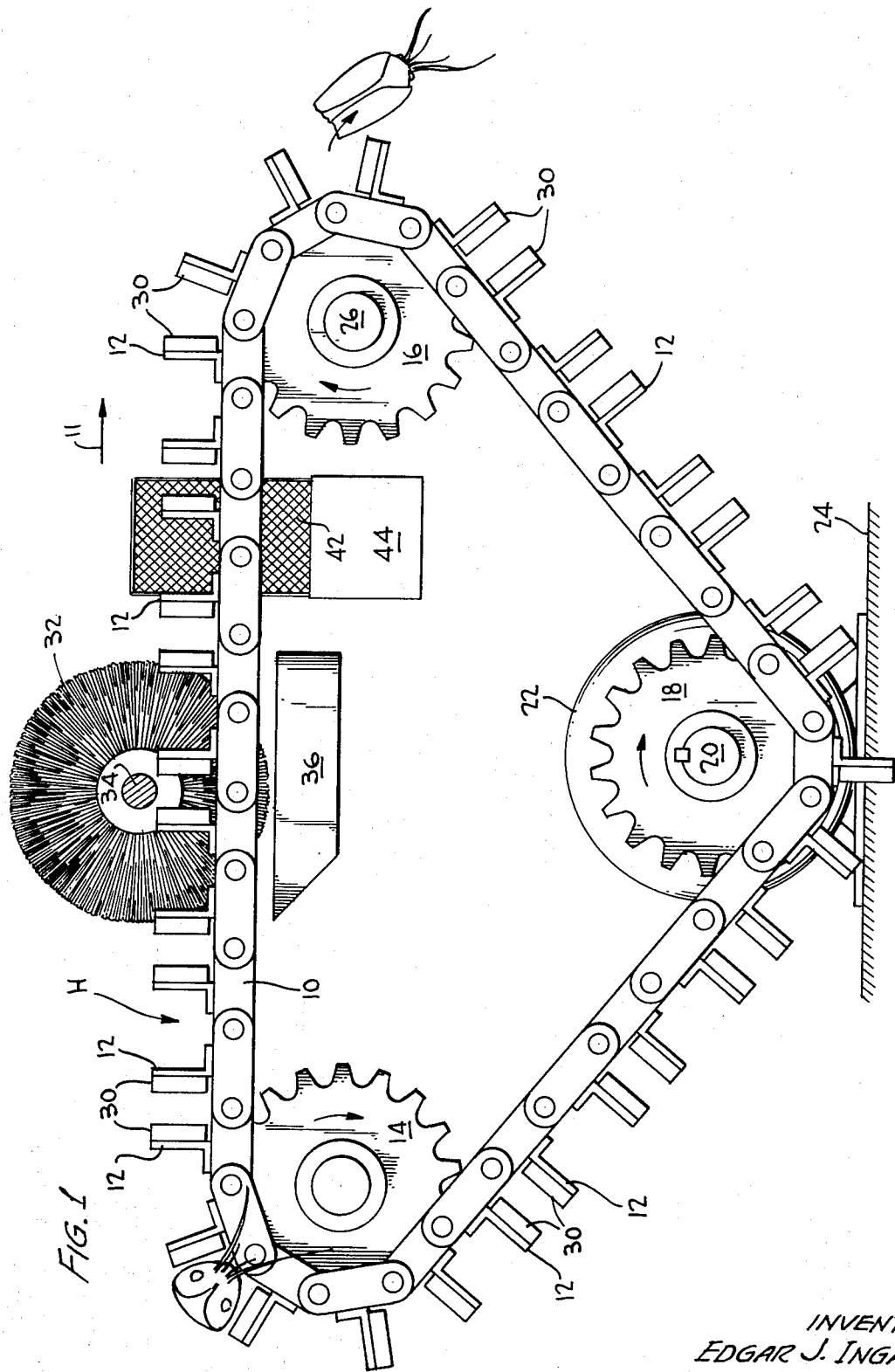

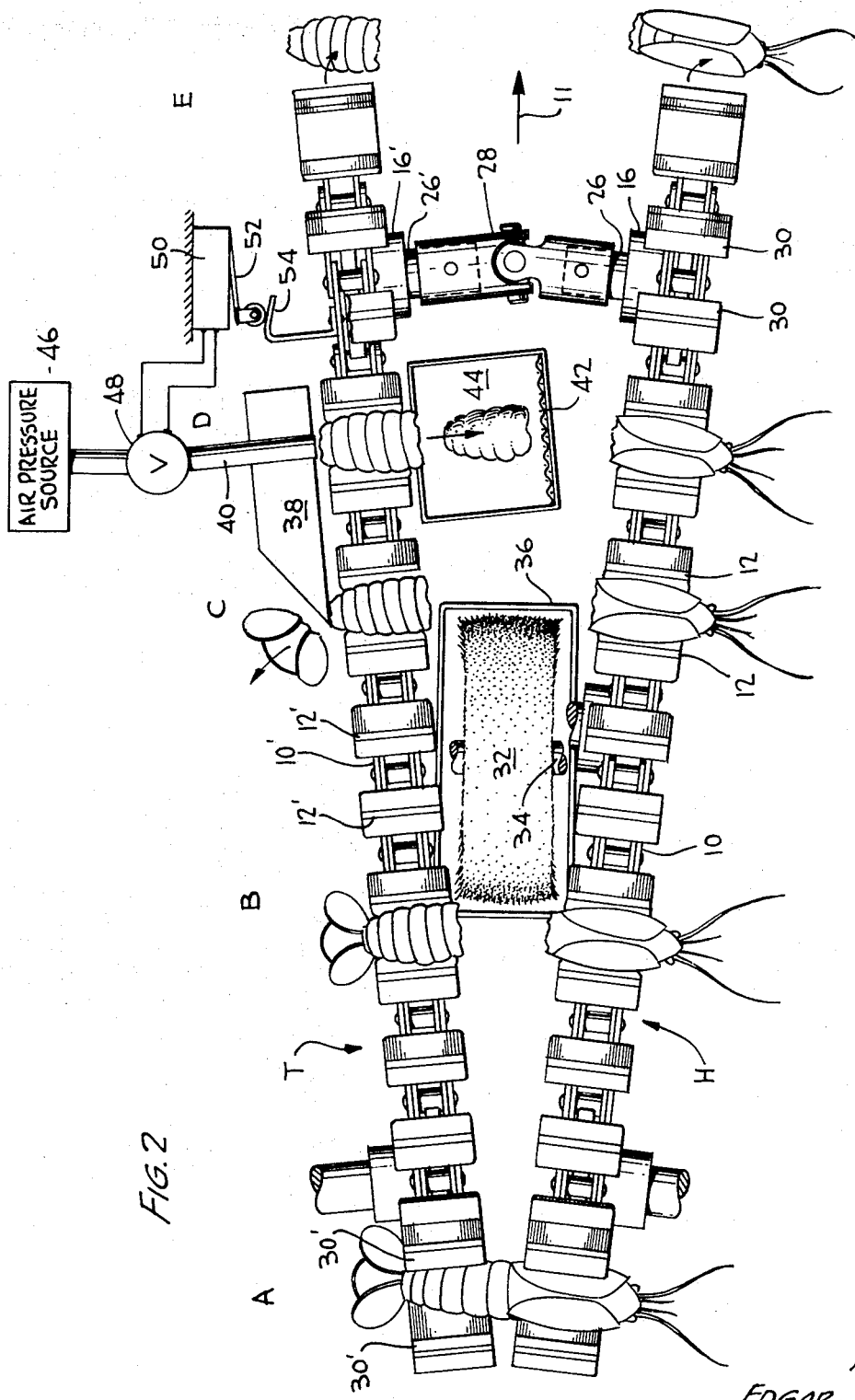

CRAWFISH PEELER

This invention relates to a machine for automatically removing the edible meat from the shells of crawfish as well as other crustaceans.

In recent years, crawfish have become increasingly popular as human food due to their attractive flavor and nutritive value. The primary limitation on their increased usage has been the lack of any suitable automatic mechanism for removing the meats from the shells, this being complicated by the tendency of the meats to cling firmly to the tail sections of the respective shells.

This tendency is utilized to advantage in accordance with the resent invention, in which the head and tail sections, respectively, of each crustacean are clamped between grippers carried by separate conveyors, portions of which move in adjacent bu divergent paths so that during their movement the head and tail sections are pulled apart. The meat is thereby withdrawn from the head section and retained within the tail section of each shell, leaving but a small amount of fat in the head section which may readily be removed and collected by suitable means such as a rotary brush.

For ejecting the mat from the tail sections, the extremity of each tail section is cut away to provide a rearwardly directed opening in the tail section of the shell through which upon being moved to a predetermind location, a suitable ejector, such as a jet of air from a nozzle, may enter the rear end of the tail section to eject the meat through the forward end thereof, for reception in a suitable collection container or receptacle. The empty shell sections are thereafter discharged from the cooperating grippers on both conveyors upon completion of their operative runs.

In order to promote a clear and rigid understanding of the invention, the preferred embodiment thereof is hereinafter described in detail with reference to the accomapnying drawings in which:

FIG. 1 is a diagrammatic side elevation of a crawfish peeling machine, in accordance with the invention.

FIG. 2 is a plan view of the machine shown in FIG. 1.

While the machine shown in the drawings is especially adapted for use in connection with crawfish, and will be hereinafter described as applied to such preferred use, it will be readily appreciated that by suitable obvious minor variations, particularly as to size of parts, it may be readily adapted for operation on lobsters or other crustaceans.

Referring now in detail to the accompanying drawings, the invention as shown in FIG. 2 comprises essentially a pair of flexible endless conveyors T and H, respectively hereinafter sometimes referred to as the tail conveyer T and the head conveyer H.

These conveyers, preferably, are of identical construction, having operative runs 10 and 10', respectively, both moving generally in the direction of the arrow 11 in FIG. 1 and 2 in a substantially rectilinear path from a loading station or location generally designated by the letter A, to and through a discharge station at a location, generally designated by the letter E in FIG. 2.

By reference to FIG. 2, it will be apparent that the operative runs 10 and 10' of the respective conveyers move in a common preferably horizontal plane, in adjacent but relatively divergent paths so that cooperating pairs of grippers such as 12—12 and 12'—12' carried by the respective conveyers H and T will be gradually moved apart by the divergent movement of the operative runs of the conveyers.

Inasmuch as the two conveyers H and T in the preferred embodiment are identical in construction and operation it will suffice to describe in detail only the construction exemplified by the head conveyer H.

Thus, referring to FIG. 1, the conveyer H in the preferred embodiment is exemplified by an endless sprocket chain, the operative run 10 of which extends generally horizontally between the relatively spaced sprocket wheels 14 and 16, the shafts of which are supported for rotation by suitable means not herein illustrated. The lower or return conveyer run passes around and beneath a further sprocket wheel 18, the shaft 20 of which is driven by a suitable gear reduction electric motor 22, the base of which is affixed to a suitable supporting surface 24. It is to be understood that the tail conveyer T will be similarly supported and guided for operative movement through its endless circuit by sprockets 14', 16' and 18', similar to 14, 16 and 18, through the drive motor 22 will be connected only to the sprocket wheel 18 of the head conveyer H.

In order that the conveyers H and T may be driven at equal velocities through their respective circuits, the shaft 26 of the head conveyer sprocket 16 is connected by a conventional universal joint or coupling 28 as shown in FIG. 2 to the shaft 26' of the corresponding sprocket wheel 16' of the tail conveyer T. Thus, by virute of the universal joint 28, the drive which is imparted to the head conveyer H by the motor 22, is transmitted to the tail conveyer T. Each of the grippers 12—12 of the head conveyer H is formed of a suitable rigid angle member. The bases of said members are ridigly affixed to adjoining links of the sprocket chain, conveyer H with the grippers 12 projecting outwardly substantially normally to the sprocket chain. Carried by the grippers 12—12 of each pair are relatively opposed pads 30—30 of a resiliently compressible material such as sponge rubber or the like between which the crawfish is adapted to be firmly gripped and held in the manner illustrated in FIG. 2.

By reference to FIG. 1, it will be apparent that during the passage of each pair of grippers 12—12 around the sprockets or sprocket wheels 14 and 16 at the loading and discharge ends of the operative run the resulting flexing of the sprocket chain will cause the grippers 12—12 of each such pair to spread apart, while during movement of each pair of grippers through the operative run 10, the grippers 12—12 will have been moved relatively toward each other for gripping engagement with the crawfish placed between them. The pairs of grippers 12—12 and 12'—12', respectively, on the head conveyer H and the tail conveyer T, will be at all times in transverse registry with each other or, in other words, transversely opposed to each other, with respect to the conveyer movement, and will be retained in such position by the coordinated driving relation of the respective conveyer chains.

Thus, as registering pairs of grippers 12—12 and 12'—12' move around the sprockets 14 and 14' at the loading station or end A of the conveyer, with the grippers of both pairs relatively separated, a crawfish or other crustacean may be manually positioned with its head section between a pair of grippers 12—12 of the head conveyer H and its tail section between the corresponding grippers 12'—12' of the tail conveyer T.

As the grippers with the crawfish positioned therebetween are carried into the rectilinear operative runs 10—10', the pairs of grippers 12—12 and 12'—12' will be brought into operative gripping engagement, respectively, with the head section and tail section of the crawfish shell. As such movement continues, the divergent paths pursued by the respective operative runs will cause a progressive separation of the grippers of the respective gripper pairs 12—12 and 12'—12', and a corresponding pulling apart or separating of the crawfish shell, so that the tail section, with the meat attached thereto, is retained between the grippers 12'—12', while the head section is retained between the grippers 12—12.

It will be apparent that after thus separating the crawfish shell and thereby withdrawing the meat from the head section, the separate head and tail sections of the shell will be carried to the ends of the operative runs 10 and 10' to be discharged at the station E as the respective gripper pairs are opened or spread by flexing of the conveyer in passing around the sprocket wheels 16, 16'.

As earlier noted the withdrawal of the meat from the head section of the crawfish will normally leave a certain amount of fat adhering to and projecting from the head section. Since this fat is a very desirable component of the crawfish, it may be removed by means such as a rotary brush 32, the shaft 34 of which is rotatably supported and driven by conventional means, not here illustreated. The brush is located between the two conveyers in a position such that its rotating periphery will be encountered by the inner end of the head section, substantially at the fat removal and collection sation designated by the letter B in FIG. 2. A suitable pan or receptacle 36 is positioned below the rotary brush 32 to receive and collect the removed fat.

No further operations are required on the head section other than to discharge it automatically at the discharge station E.

However, it will be noted that the crawfish are so positioned in the grippers of the respective conveyers that the rear extremity of the tail of each crawfish projects outwardly beyond and to one side of the conveyer and grippers 12'—12'. This extremity is automatically severed, as by means of a stationary shearing block or cutter 38 fixedly supported at the outer lateral side of the conveyer T with its cutting edge directed reversely to the conveyer movement and in the path of movement of the tail section.

The cutting away of the tail rear extremity will thus obviously leave the remaining tail section with a rearwardly directed opening which, upon removal of the tail section to the meat ejecting station D, (FIG. 2), is brought into lateral alignment with a laterally directed nozzle 40 through which a pressurized fluid such as air is directed through said opening and into the shell to expell or eject the meat therefrom in the path indicated by the arrow in FIG. 2. Prior to ejection of the meat, the sand vein of the crawfish normally will first have been ejected at a comparatively high velocity.

Subsequently, the ejected meat will normally be projected against the screen 42 to then fall by gravity into a meat receptacle 44. The openings through the screen 32, however, are preferably sufficiently coarse or large as to permit passage therethrough of the majority of the ejected sand veins, and such sand veins as do not pass through the screen 42 normally will cling to and be retained on it to thus be separated from the meats which drop into the receptacle 44.

While there may be a constant flow of pressurized air from the nozzle 40, it is desirable for purposes of economy that such flow be intermittent and timed to occur only for the comparatively brief interval that the opening in the tail section of each shell is located abreast of and in alignment with the nozzle 40. For this purpose the communication between the nozzle 40 and a source 46 of pressurized air or other fluid is controlled by a conventional solenoid valve 48 which is energized and opened at appropriate intervals be means of a micro-switch 50 with which is is connected in circuit as shown in FIG. 2. The control arm 52 of micro-switch 50 is actuated periodically by sloping surfaces of cam members 54, (only one of which is shown in FIG. 2) carried by the tail conveyer T. Such members 54 will be affixed to the tail conveyer T at locations such that they will close the micro-switch 50 to thus energize and open the valve 48 each time a tail section of a shell is moved abreast of the nozzle 40.

After the meats are ejected from the tail sections, the latter are carried around the sprockets 16' and discharged at the discharge station generally indicated at the location E.

Thus in the overall operation of the invention which is believed to be readily apparent from the foregoing, the crawfish to be operated upon are successively placed in the open grippers 12—12 and 12'—12' respectively of the two conveyers at the loading station A. All crawfish will be uniformly oriented, with their heads facing in the same direction, so that the heads of all are carried by the head conveyer H, while the tails or tail sections are carried by the conveyer T. As the grippers carrying each crawfish, complete their curved path around the sprocket wheels 14, 14' at station A, and commence their opprative runs 10, 10' through substantially rectilinear paths, the head and tail sections will be firmly gripped and held between the laterally opposed pairs of grippers 12—12 and 12'—12' and the relative divergent movement of the operative runs 10 and 10' will result in a pulling apart of the head and tail sections and removal of the meat from the head section.

As the separated sections move past the station B, any fat clinging to the inner end of the head section is removed by the rotary brush 32 for eventual reception in the fat pan or container 32. The meat which is attached to the tail section is accordingly pulled out of the head section, and as the tail section progresses to the station C, its rear extremity is severed and removed by engagement with the cutter 38 to leave a rearwardly directed opening through the tail section.

Then, as the tail section continues its movement to a location at station D abreast of and aligned with the nozzle 40, one of the cam members 54 will at this time close the micro-switch 50 and actuate valve 48 to release a high velocity jet of pressurized air through the nozzle 40 and into the rear end of the tail section through said opening.

Initially, this jet or blast will project the sand vein forwardly from the meat to pass through or be retained on the screen 42 and thereby separated from the meat, while the meat itself, which is subsequently ejected, will fall into the meat receptacle 44, being intercepted, if necessary, by the screen 42.

Manifestly, the empty head section and tail section will be simultaneously and automatically discharged upon movement of their respective gripper pairs around the sprockets 16 and 16' at the discharge station E.

Obviously, by suitable adjustments in the size of parts, the invention may be adapted for use with crustaceans other than crawfish, such as lobsters.

Having thus fully disclosed my invention, I claim:

1. A machine for removing the meat of crustaceans from the shells, comprising a pair of endless flexible head and tail conveyers, respectively, means guiding said conveyers for movement through circuits in which each conveyer has relatively spaced convexly curved infeed and discharge portions and a substantially rectilinear operative run extending between said portions, a pair of rigid grippers affixed to each conveyer and relatively spaced apart in the direction of the conveyer movement, said grippers of each pair being disposed to project radially outwardly from said curved portions of the conveyers in spread-apart relation during movement therewith, and to relatively approach each other during movement with said operative runs, said operative runs moving in relatively diverging directions from said infeed portions to said discharge portions, means driving said conveyers at equal velocities with their respective pairs of grippers at all times in registry with each other transversely to the conveyer movement, whereby the head and tail sections of a crustacean placed between the relatively spaced-apart grippers of said registering pair respectively at the infeed portions of the conveyers will be firmly clamped between both pairs of grippers, and separated incident to the divergent movement of said grippers with the operative conveyer runs, and will then be discharged as the grippers of each pair are spread apart incident to their movement with said convexly curved discharge portions of the conveyers, a cutter positioned laterally alongside one of said conveyer for severing the rear extremity of said tail section from the remainder thereof to leave an endwise rearwardly directed opening in said tail section, means for directing a high velocity jet of fluid into the tail section through said opening whereby to eject the meat from said tail section, said last mentioned means comprises a nozzle directed forwardly toward said one conveyer, a source of pressurized fluid communicating with said nozzle, valve means controlling the communication between said fluid source and said nozzle, and means carried by one of the conveyers for controlling said valve to permit discharge of fluid through said nozzle each time a tail section with its opening formed therein moves into alignment with the said nozzle, said valve being a solenoid valve and said means for controlling the valve comprising a microswitch in circuit with the solenoid valve and having a movable control arm, and a cam member on one of said conveyer at a location to engage said arm and close said micro-switch when said tail section is moved abreast of and into alignment with said nozzle.

2. A machine for removing the meat of crustaceans from the shells, comprising a pair of endless flexible head and tail conveyers, respectively, means guiding said conveyers for movement through circuits in which each conveyer has relatively spaced convexly curved infeed and discharge portions and a substantially rectilinear operative run extending between said portions, a apir of rigid grippers affixed to each conveyor and relatively spaced apart in the direction of the conveyer movement, said grippers of each pair being disposed to project radially outwardly from said curved portions of the conveyers in spread-apart relation during movement therewith, and to relatively approach each other during movement with said operative runs, said operative runs moving in relatively diverging directions from said infeed portions of said discharge portions, means driving said conveyers at equal velocities with their respective pairs of grippers at all times in registry with each other transversely to the conveyer movement, whereby the head and tail sections of a crustacean placed between the relatively spread-apart grippers of said registering pair respectively at the infeed portions of the conveyers will be firmly clamped between both pairs of grippers, and separated incident to the divergent movement of said grippers with the operative conveyers runs, and will then be discharged as the grippers of each pair are spread apart incident to their movement with said convexly curved discharge portions of the conveyers, including means positioned medially of the length of said operative run of one said conveyer for removing the fat from the head sections of the crustaceans after the meat has been extracted therefrom incident to the relative divergent movement of the respective conveyers.

3. A machine as defined in claim 2 in which said last mentioned means comprises a rotary brush rotatably supported in position for peripheral engagement with the rear end portions of the respective head sections.

* * * * *